United States Patent [19]
Ohlsson

[11] Patent Number: 4,663,916

[45] Date of Patent: May 12, 1987

[54] APPARATUS FOR FORMING, WELDING AND CONVEYING PACKS

[75] Inventor: Ingemar Ohlsson, Malmo, Sweden

[73] Assignee: Tetra Pak Developpement S.A., Switzerland

[21] Appl. No.: 772,852

[22] Filed: Sep. 5, 1985

[30] Foreign Application Priority Data

Sep. 14, 1984 [DE] Fed. Rep. of Germany ....... 3433802

[51] Int. Cl.⁴ ................................................ B65B 9/06
[52] U.S. Cl. ......................................... 53/551; 53/373
[58] Field of Search .................. 53/551, 552, 567, 373

[56] References Cited

U.S. PATENT DOCUMENTS

| | | | |
|---|---|---|---|
| 2,738,631 | 3/1956 | Jarund | 53/551 |
| 3,320,718 | 5/1967 | Thesing | 53/551 |
| 3,546,835 | 12/1970 | Morley | 53/551 X |
| 4,262,473 | 4/1981 | Brooke | 53/551 X |

Primary Examiner—John Sipos
Attorney, Agent, or Firm—Paul & Paul

[57] ABSTRACT

The specification describes an apparatus for forming, welding and conveying packs, particularly liquid filled plastic bags, where the forming shells (17) are each made up of two half shells provided on two parallel, opposing endless conveyors (1,3) with a circling motion, wherein heatable welding jaws (2) are located between successive half shells on one endless conveyor (1) and counter pressure jaws (4) are provided on the opposite endless conveyor (3).

To enable forming shells of a specific volume to be produced between opposing endless conveyors without any great outlay on construction and with safe operation, the invention provides for each half shell to be formed by a trough plate (6) which is supported displaceably and deformably between two adjacent welding jaws (2,4).

14 Claims, 6 Drawing Figures

APPARATUS FOR FORMING, WELDING AND CONVEYING PACKS

The invention relates to an apparatus for forming, welding and conveying packs, particularly liquid filled plastic bags, where the forming shells are each made up of two half shells provided on two parallel, opposing endless conveyors with a circling motion, wherein heatable welding jaws are located between successive half shells on one endless conveyor and counter pressure jaws are provided on the opposite endless conveyor.

A wide variety of very different machines are known for making packages. In the manufacture of plastic bags filled with liquid it is already known to guide a liquid filled plastic bag vertically or obliquely with at least one vertical component, into a welding station in which heatable welding jaws and opposing counter pressure jaws are moved towards one another through the filled plastic bag, thereby forming transverse seams in the filled packing tube. If the transverse seams are made broad enough, they can be severed lengthwise in the region of the seam, in such a way that the individual liquid filled plastic bags can be separated by the cut and yet remain impervious to liquid.

In known welding stations expensive constructions were always necessary to adapt the movement of the welding jaws to that of the filled packaging tube. If the tube moves continuously, then the jaws must also be movable at the same speed during the welding process. Before and after the welding process the jaws must additionally have opportunities to move perpendicularly to the direction in which the web is conveyed. Appropriate constructions have hitherto been so expensive that production with them is uneconomic and they are troublesome to operate.

If endless conveyors known per se are used to make forming shells in which the plastic bags can be inserted and welded, the use of accurately shaped shells is a failure. This is because, if there is exact dimensional stability to provide spaces which can e.g. control dosing, the forming shells cannot be moved over the periphery of an endless conveyor without great expense. If on the other hand exact shaping of the forming shells is sacrificed, then dosing is in any case not possible in packs filled with liquid or other fluids.

The problem of the invention is to improve an apparatus for forming welding and conveying packs of the above mentioned type, so that forming shells of a specific volume can be provided between opposing endless conveyors, without a great outlay on construction and with safe operation and minimum trouble.

According to the invention the problem is solved, in that each half shell is formed by a trough plate which is supported displaceably and deformably between two adjacent welding jaws. In this way the exact shape of each half shell, and thus the complete forming shell which ultimately determines the volume to be dosed, depends on the shape of the two trough plates, which in turn depend on the distance between two adjacent welding jaws. The movement of the jaws can be adapted particularly well to the continuous movement of the filled tube if the jaws are arranged on endless conveyors moving round opposite one another, in the manner described above. The conveyors generally have a straight portion at one side and another straight portion on the opposite side, while curved regions provide the connection for transition from one side to the other.

The actual welding work will preferably be carried out in the region of the straight side, and in the curved regions between two straight sides the distance between adjacent welding jaws must necessarily vary.

As a result of the measures proposed in the invention the welding jaws are adapted, as desired, to the continuous speed of the packaging tube, and there is accuracy in matching the shape despite the spreading effect of the endless conveyor in its round transitional regions, as described above.

In accordance with the invention it is particularly advantageous for the trough plate to be in the form of a cylindrical surface at least half open at one side, and for its curvature to be variable as the distance between adjacent supports varies. Packs are to be formed from the plastic tube preferably filled with fluid, the packs are to be welded so as to seal them from one another, and they are to be conveyed away. If an endless conveyor is used for welding in the manner described, and if the trough plates have an elongated shape, e.g. that of a cylindrical surface at least half open at one side, then cylindrical packs can thus be formed, welded and conveyed. Since the means for holding the trough plates are provided on the wleding jaws, but the distance between adjacent holding means is greater in the region of the transition from one straight side to the other on the endless conveyor than it is at the respective straight side, it was found difficult to allow the trough plate to be deformed and yet to make forming shells with it. These difficulties have been overcome surprisingly simply and appropriately as a result of the deformability of the actual trough plates and their displaceable mounting on the welding jaws.

In an advantageous further embodiment of the invention the trough plate is supported at its opposing ends by a chain or a belt, by means of at least two adjacent pins at each end, arranged on the welding jaws or jaw supports. The pins may be fixed to or mounted movably on the jaws or supports. In either case a flexible support is provided for the trough plates. In special embodiments the flexibility of the support for the trough plates alone can be sufficient to compensate for the change in the spacing between adjacent welding jaws or counter pressure jaws. However, in most embodiments and as a general rule with the apparatus of the above type, the movable arrangement of the supporting pins is not sufficient and the trough plates themselves have to be deformed. Here such deformation is deliberately allowed in accordance with the invention and yet it operates satisfactorily. The extension of the endless conveyor, e.g. of the welding or counter pressure jaws fixed to the chain or belt, may be completely and satisfactorily picked up and compensated for by deformation of the trough plates themselves in conjunction with the movable mounting of the pins on the welding jaws.

In accordance with the invention it is particularly advantageous for the means for mounting the trough plate to comprise slots provided in the end regions thereof and pairs of retaining pins fixed to the welding jaws or jaw carriers and projecting into the slots. The movable arrangement of the retaining pins on the welding jaws or jaw supports may bring structural difficulties, and it is certainly simpler for an expert if the pins can be fixed to the jaws. This condition too is fulfilled by the above-mentioned measure according to the invention, in that the pins fixed to the jaws can support the trough plates through slots and can slide to and fro within the slots. A particularly reliable support is provided if the pins are used in pairs at the end portions of the trough plates.

The deformability of the trough plates can be controlled in a particularly favourable and reliable way when the trough plate is made of spring steel sheeting in accordance with the invention.

Other features, applications and advantages of the invention will emerge from the following description of a preferred example, in conjunction with the drawings, in which.

Figure 1:
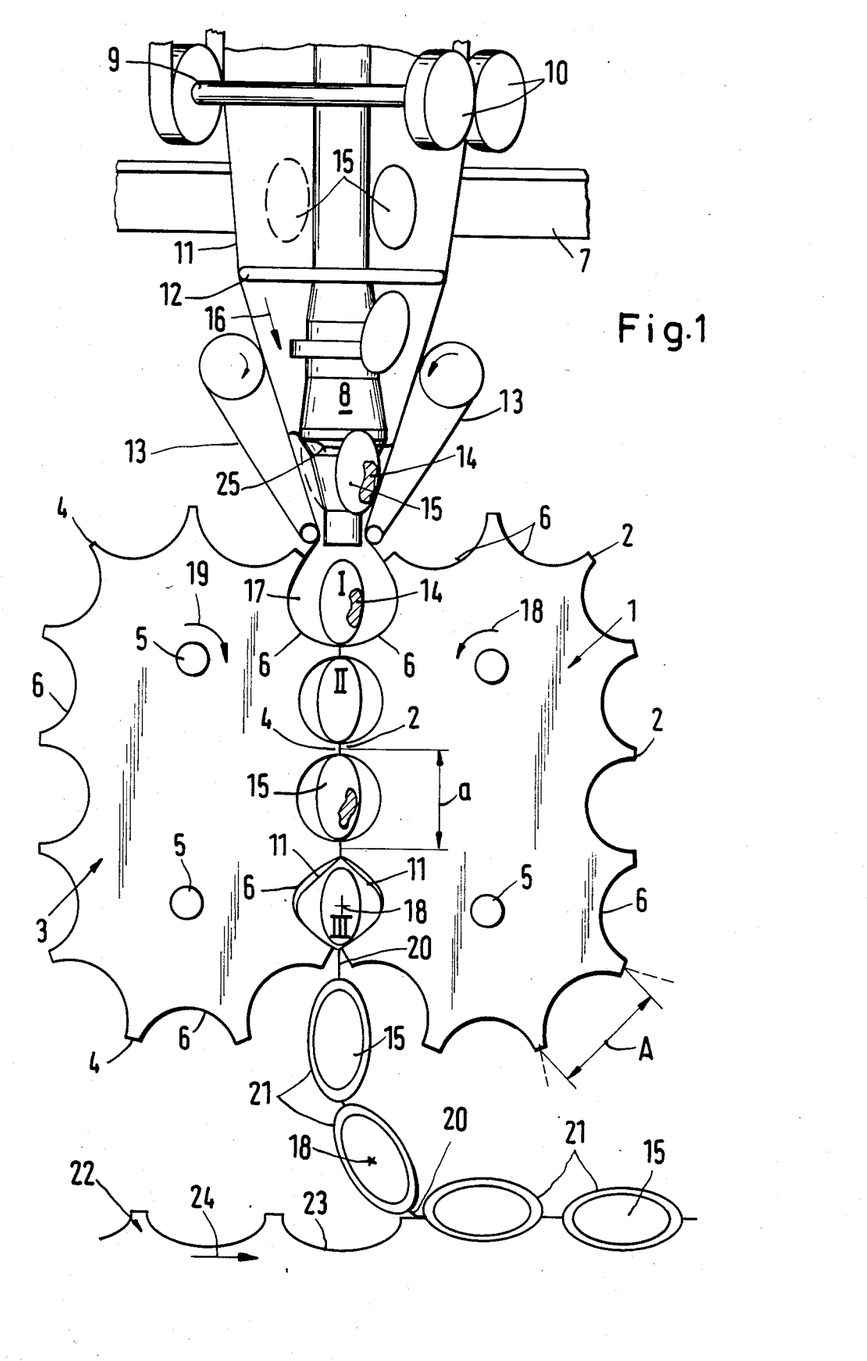
FIG. 1 is a diagrammatic view in section through a forming and welding chain according to the invention, for making liquid filled plastic bags.

As an explanation of the whole apparatus, FIG. 1 shows the connection with a special pack producing machine. In the central part the right hand endless conveyor, shown generally at 1, will be seen with the heatable welding jaws 2, shown only as connecting lines in FIG. 1, and with the opposing endless conveyor, shown generally at 3, with the counter pressure jaws 4, which like the heatable jaws 2 are only represented diagrammatically by connecting lines. The two conveyors 1 and 3 are arranged opposite one another with two straight sides in contact with one another in the central plane and with the straight outer sides facing away from one another. The shafts 5 of the conveyors 1 and 3 are indicated in FIG. 1, while other details down to the diagrammatically indicated half shells formed by trough plates 6 can be seen more clearly from FIGS. 2 to 6.

The trough plates 6 are identical in both conveyors 1 and 3 and have the same shape and mounts. The deformability of the plates 6 will now be explained with reference to FIG. 1.

A filling pipe 8, supported on the frame 7 of the machine in a manner not illustrated, is shown over the endless conveyors 1 and 3. The pipe extends vertically in alignment over the plane linking the two straight sides of the conveyors 1 and 3. A pair of rollers 10 for conveying a plastic tube 11, driven by a shaft 9, will be seen at the top. The tube 11 is drawn over a supporting ring 12 which concentrically surrounds the filling pipe 8 at a spacing, and is flattened by two supporting belts 13 without any contact with the lower nozzle end of the filling pipe 8.

In the preferred embodiment shown here the plastic tube 11 carries circular ends 15 which are welded onto diametrically opposed sides in regions 14. When the tube 11 moves downwards in the direction of the arrow 16 these ends come to rest opposite one another in the uppermost still open forming shell 17. Later they are arranged substantially across the longitudinal axis 18 acquired by the liquid pack. Since the plane of the ends 15 is inclined somewhat to the plane of the paper in FIG. 1, some of the circular ends 15 appear in elliptical form.

The forming shell 17 is made up of the two trough plates 6 forming two half shells. When the shell 17 has moved down from the uppermost, first position I to the second position II and has closed in the process, the exact volume of a complete shaping shell is obtained, and the welding jaws 2 and 4 or the heatable welding jaws 2 and the non-heatable counter pressure jaws 4 lie exactly opposite one another along the straight side in the plane of contact below the axis of the filling pipe 8. Since the sides of the endless conveyors 1 and 3 move downwards in the direction of the curved arrows 18 and 19 at the same speed as the web 11 of sheeting moves in the direction of the arrow 16, the cross welding of the tube, already welded tight lengthwise and provided with the ends 15, can be completed. In the bottom position III the forming shell 17 opens up again, whereby the wall of the plastic tube 11 is lifted off the trough plate 6 in question, beginning at the top. For this reason different lines will be seen representing the trough plates 6 and the tube 11 at least in the upper half of station III in FIG. 1. Further down the cross weld 20, now separating two plastic bags 21 sealed absolutely tightly, will be seen below the opening jaws 2 and 4.

At the bottom of FIG. 1 the chain of plastic bags 21 can be seen entering a further conveying chain 22 and being conveyed away. The chain 22 has open, oval troughs 23 moving in the direction of the arrow 24. The separating process which follows is understandable to an expert but now shown here. The liquid level is shown at 25 in the lower part of the filling pipe 8.

Figure 2:
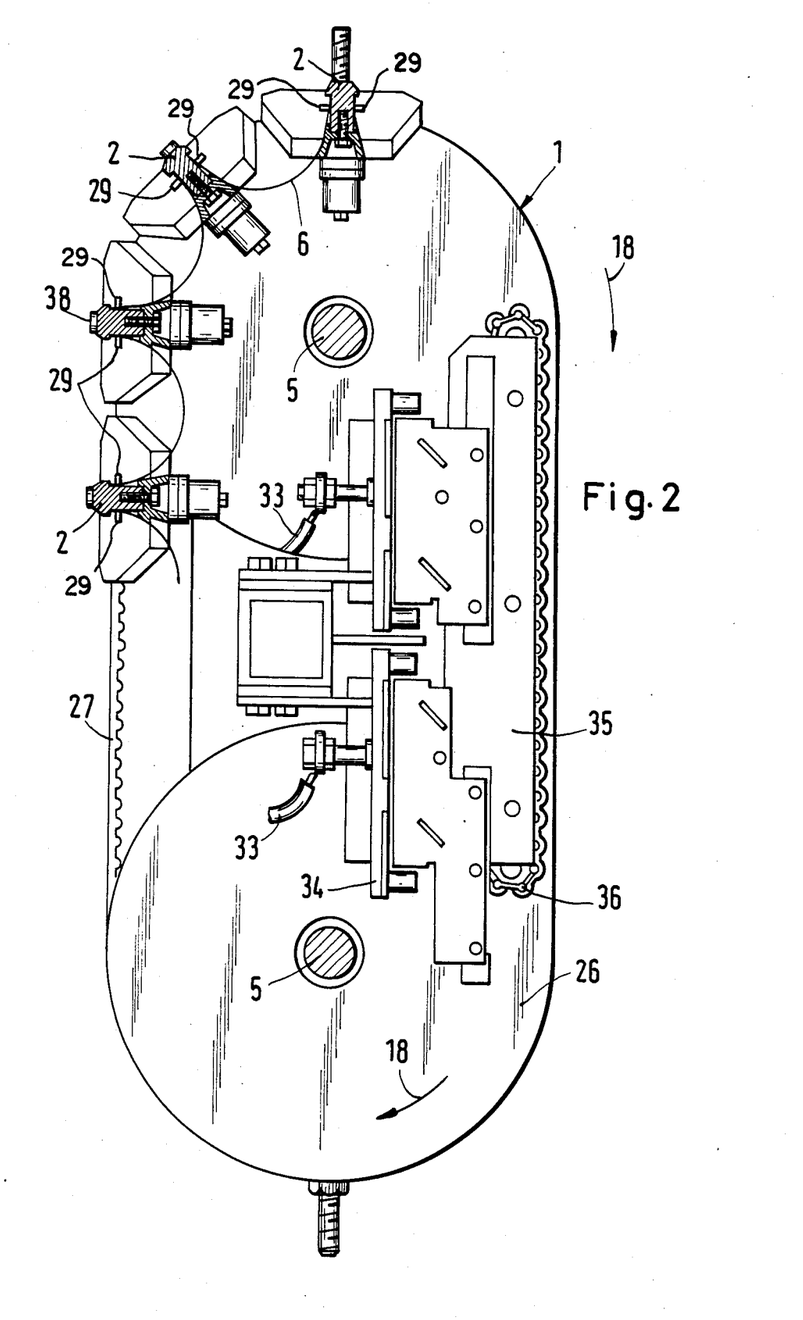
FIG. 2 is a view, partly broken away, of one of the two opposing endless conveyors shown in FIG. 1, with some details, generally along the line II—II in FIG. 4.
Figure 4:
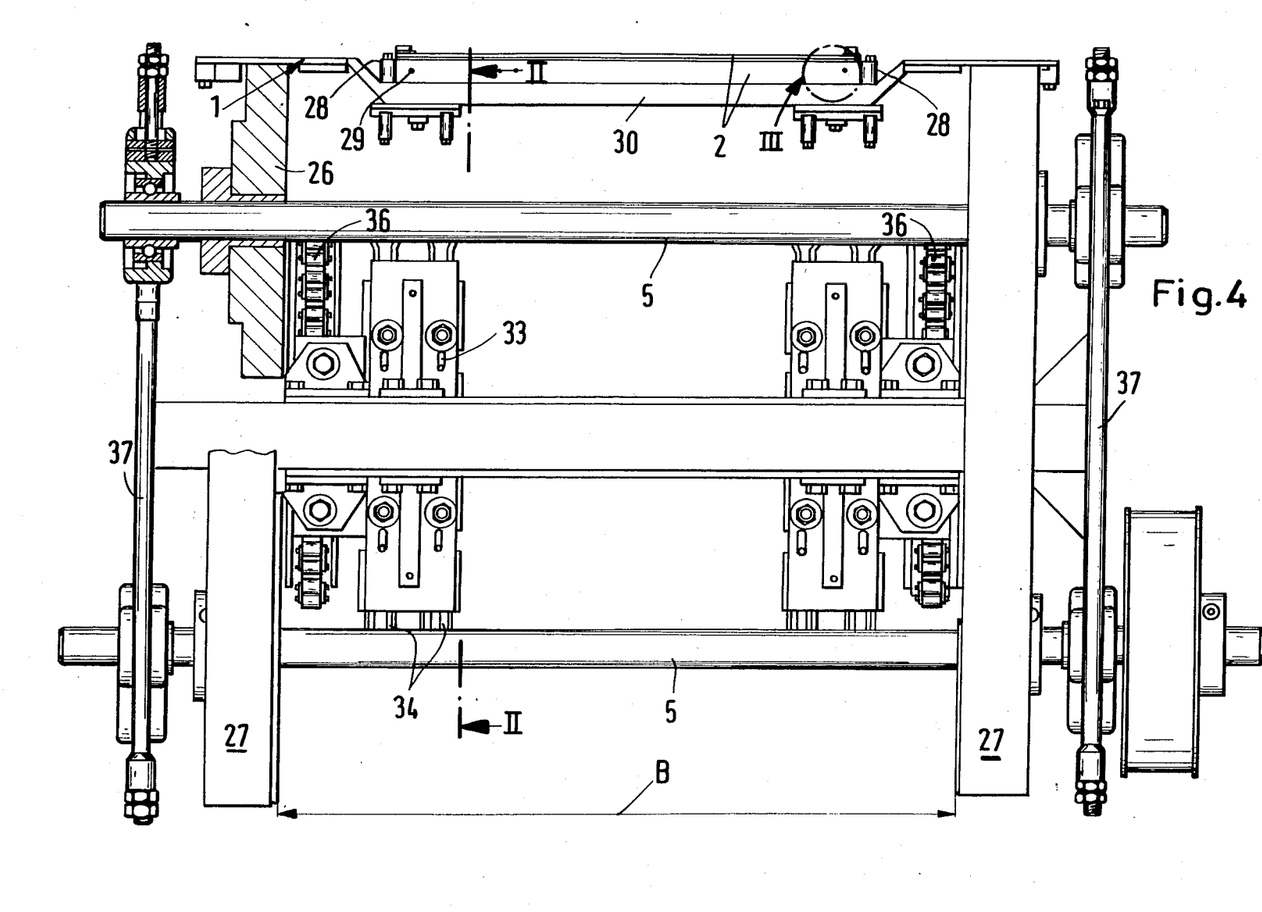
FIG. 4 is a side view, partly broken away, of the endless conveyor in FIG. 2, in a central vertical section.
Figure 5:
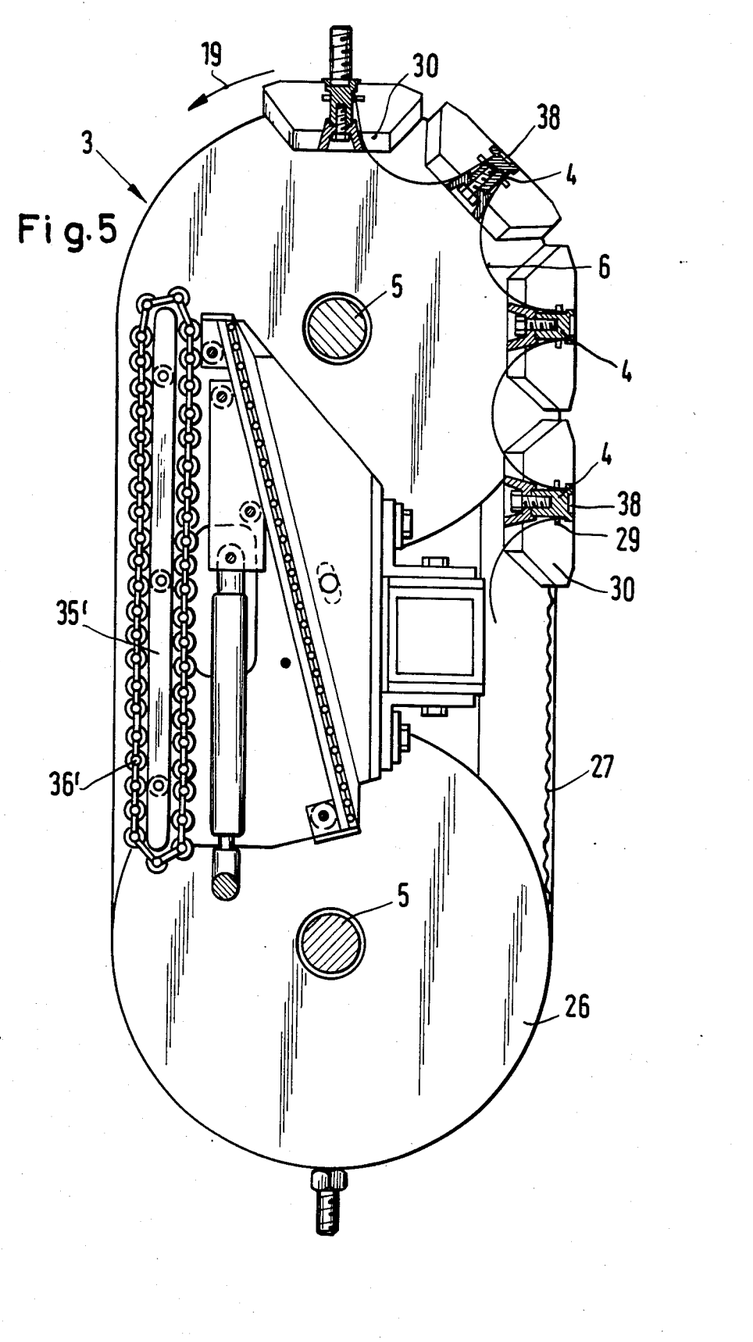
FIG. 5 shows the other endless conveyor, opposite that in FIG. 2 and in a view similar to FIG. 2.

As best seen in FIG. 2, the jaws 2 extend or protrude beyond the outer periphery of the plastic toothed belt 27 of the conveyor 1. Similarly, as best seen in FIG. 5, the counter jaws 4 extend beyond the outer periphery of the plastic toothed belt 27 of the conveyor 3. As shown in FIGS. 2 and 4, as the jaws 2, 4 travel around the semicircular portion of the conveyors 1, 3, the jaws 2, 4 extend generally radially from the shafts 5 of the conveyors 1, 3. Depending upon whether equivalent points on the jaws 2, 4 protrude beyond or extend within the belts 27 the equivalent points on the jaws 2, 4 will either be spaced further apart or closer together when the jaws 2, 4 travel through the semicircular portions of the conveyors 1, 3 than when the jaws 2, 4 travel through the straight sections of the conveyors 1, 3.

When the conveyors 1 and 3 move in the direction of the arrows 18 and 19 the distances a between the protruding outer ends of two adjacent pairs of jaws 2, 4 will be seen to change when the jaws open. For example, the distance a is smaller than the next distance between the upper jaw 2, 4 and lower jaw 2, 4 in position III. In the lower (and obviously also the upper) region of transition from one straight side to the other the distance between two adjacent jaws 2 and 4 increases. The distance shown at A in the bottom right hand corner of FIG. 1 is considerably larger than the distance a in the region of the straight side. In this embodiment of the forming and welding chain the widening of the trough plates 6 through enlargement of the distance A in the lower region and, in the direction of rotation, the constriction of reduction of the distance between adjacent jaws 2, 4 in the upper region are desirable. They enable the plastic tube 11 shown at the top of FIG. 1 in position I to be placed in a still widened open forming shell 17 with gentle movements, and the shell 17 does not then close until the transition from position I to position II below it in FIG. 1, as illustrated.

The forming shells 17 clearly have the shape of a straight cylindrical surface in the region of the straight opposing sides of the conveyors 1, 3. In this state the trough plates 6 are half open at one side and can be seen to have greater curvature at distance a then they have when they have been opened as shown at the bottom right hand corner of FIG. 1, at distance A.

To allow this spreading of the trough plates 6 from the region of the straight side of the conveyor 1 or 3 into the curved transitional region (distance A) and back again, the trough plates are made of spring steel sheeting and are deformable. In particular the curvature of the surface of the half cylinder is variable, in that the half cylinder alternately opens up and narrows down again in the course of its movement round the conveyors 1, 3. If the conveyors 1, 3 are constructed as shown in FIGS. 4 and 6, with plastic toothed belts 27, arranged at a spacing B, guided around over each belt gear 26, the gears being spaced from one another for each shaft 5, then it will be seen that the central axes 18 of the cross sealed packs extend parallel with the shafts 5, and that no deformation or change in the curvature of the trough shells 6 is provided for in the direction of the axes 18.

Figure 3:
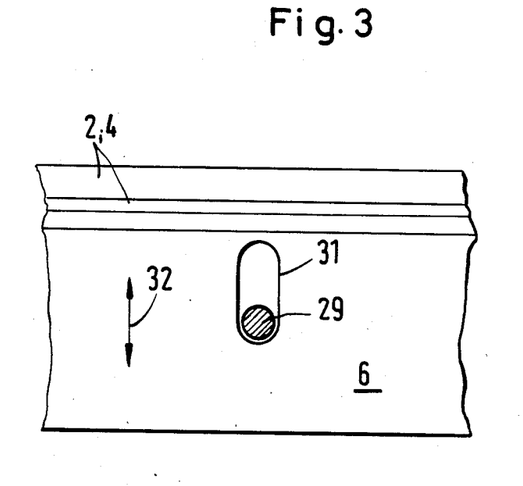
FIG. 3 is a detail from FIG. 4, as indicated at III therein, showing a retaining pin in a slot.

Each trough plate 6 is fixed at its opposing ends 28 to the two plastic toothed belts 27, spaced from one another at the distance B, by pairs of retaining pins 29 which are fixed to the welding jaws 2 (and similarly to the counter pressure jaws 4) or alternatively to the jaw supports 30. The pins 29 could indeed be mounted so as to tip on the jaws 2, 4 in the direction of their longitudinal axes, but the construction is simpler if the supporting means include pins 29 fixed to the welding jaws 2, 4 and slots 31 in the end regions of the trough plates 6. The retaining pins 29 then project into the slots 31 as shown clearly in FIG. 3. They may move within the slots or the trough plate may move over the pins 29, e.g. in the direction of the double arrow 32. FIG. 3 shows the state where the trough plate 6 has its maximum curvature. When the distance between two adjacent welding jaws 2, 4 is increased, the plate 6 may slide down as shown in FIG. 3, so that the retaining pin 29 would appear at the top in the position of maximum extension.

In FIGS. 2 and 4 the endless conveyor 1 is shown with the heatable welding jaws 2. Heating is produced in known manner by supplying electric current through leads 33 with the connections shown in FIG. 4 and via the copper rails 34. In this way the jaws 2 are heated in the region of the supporting means 35, where they are guided over the roller chain 36 and supported. The bearings for the shafts 5 are shown generally at 37 in FIG. 4.

Figure 6:
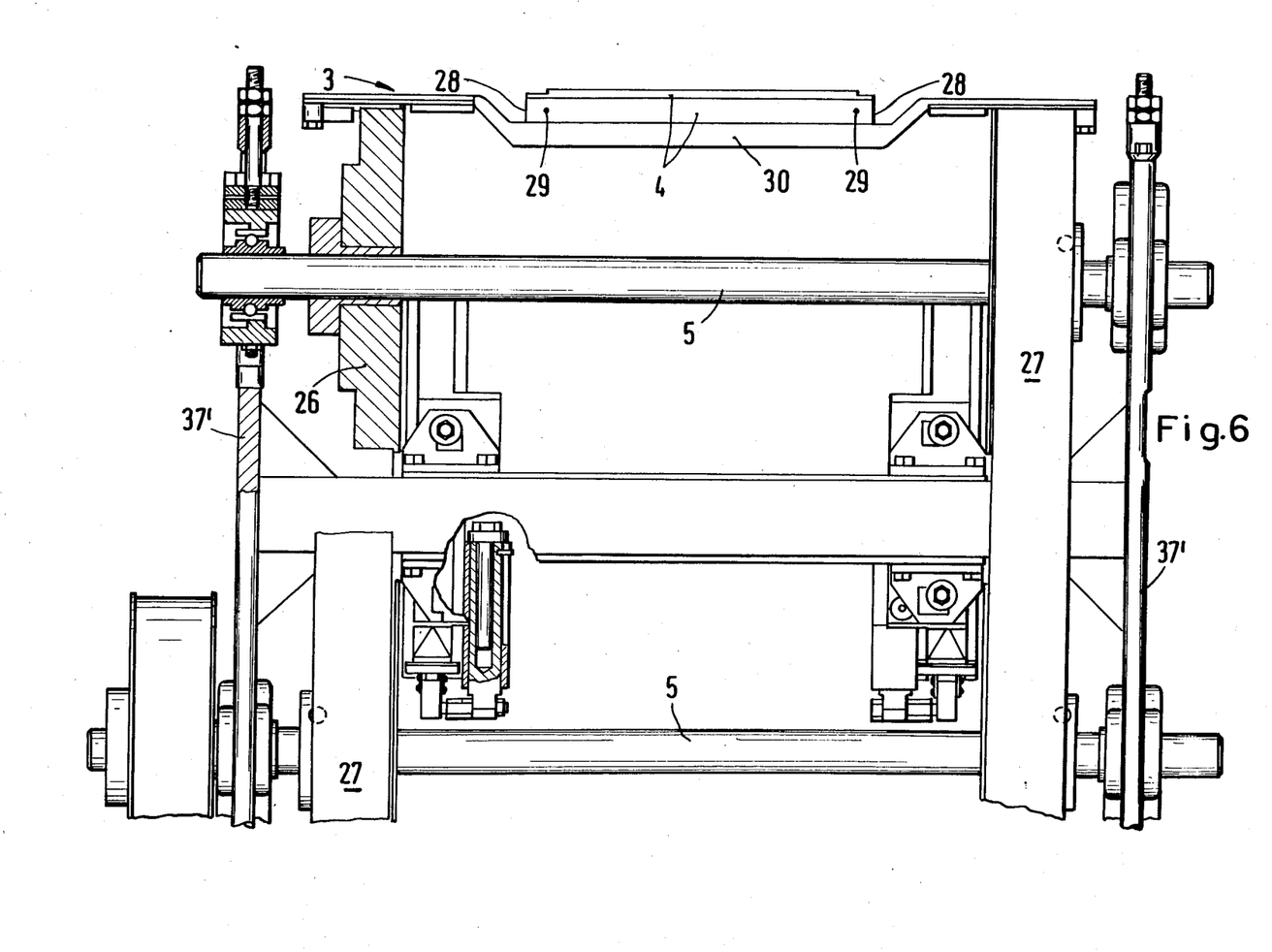
FIG. 6 is a view similar to FIG. 4 but showing the endless conveyor with the counter pressure jaws.

In a similar way and with the same construction, the shafts 5 are supported by means 37' in the endless conveyor 3 shown in FIGS. 5 and 6. These again show the belt gears 26, arranged longitudinally of the shafts 5 at a spacing from one another, with the plastic toothed belt 27 placed over them. The belt 27 carries the jaw supports 30 and counter pressure jaws 4, in the end regions of which the ends 28 of the trough plates 6 (not shown in FIG. 6) are located. Here again the supporting pins 29 can be seen, and FIG. 5 shows the different curvature of the trough plates at the straight sides and in the round transitional regions between them. As shown in FIG. 5, the endless conveyor 3 has a supporting means 35' in which a roller chain 36' is responsible for supporting the counter pressure jaws 4 with the rubber inserts 38.

I claim:

1. An apparatus for forming, welding and conveying fluidfilled packs formed from a packaging tube, the apparatus comprising:

a pair of endless conveyors, each conveyor including at least one section having a first curvature in which the conveyor moves along a curve and a straight welding section having a second curvature in which the conveyor moves in a generally straight line parallel to and spaced from the other conveyor, the welding section having an entrance;

means for interposing the packaging tube between the conveyors at the entrance to the welding section;

means for moving the conveyors and the packaging tube at the same rate and direction in the welding section;

means for filling the packaging tube at the entrance of the welding section;

each conveyor including a plurality of parallel, spaced jaws for welding together portions of the packaging tube to form individual packs, the jaws of each conveyor lying opposite the jaws of the other conveyor in the welding section to form pairs of adjacent jaws, each pair of adjacent jaws welding a portion of the packaging tube in the welding section;

each conveyor further including a plurality of forming shells comprising a pair of deformable trough plates for containing unsealed portions of the packaging tube in the welding section to meter the volume of the individual packs, each trough plate extending between a pair of adjacent jaws on a conveyor; and each conveyor further including means for displaceably mounting each entire trough plate between and relative each of the adjacent jaws, each trough plate being displaced relative to the adjacent jaws as the trough plate moves between sections of the conveyor having different curvatures.

2. An apparatus according to claim 1 wherein the trough plates form opposed pairs in the welding section and the opposed pairs of trough plates and the pairs of jaws adjacent the trough plates form generally cylindrical interior surfaces to contain the unsealed portion of the filled packaging tube.

3. An apparatus according to claim 1 or 2 wherein the packaging tube is filled with liquid at the entrance to the welding section.

4. An apparatus according to claim 1 in which each trough plate has the shape of a cylindrical surface at least half open at one side in the welding section.

5. An apparatus according to claim 1 wherein each trough plate has edges extending parallel to the adjacent jaws, and the means for displaceably supporting each trough plate includes a plurality of slots formed in each trough plate adjacent the edges thereof extending parallel to jaws, the slots being elongated in a direction parallel the direction in which the conveyor moves, the means supporting the trough plate further including a pin extending through each slot, the distance between the pins extending through the slots adjacent to opposite edges of each trough plate varying as the trough plate moves between sections having different curvatures.

6. An apparatus according to claim 5 wherein the pins are mounted in the jaws.

7. An apparatus according to claim 5 wherein each conveyor includes at least one flexible chain and jaw support means for mounting each jaw on the at least one flexible chain.

8. An apparatus according to claim 5 wherein each conveyor includes at least one flexible belt and jaw support means for mounting each jaw on the at least one flexible belt.

9. An apparatus according to claims 7 or 8 in which the pins are mounted in the jaw support means.

10. An apparatus according to claim 5 wherein the jaws are elongated and extend perpendicular to the direction of the motion of the conveyor, the pins being mounted in the jaw proximate the ends thereof.

11. An apparatus according to claim 1 wherein the trough plates are made from spring steel plates.

12. An apparatus according to claim 1 wherein the jaws of at least one of the pair of conveyors include welding means.

13. An apparatus according to claim 12 wherein the welding means are heatable.

14. An apparatus according to claim 1 wherein the jaws of at least one of the conveyors include counter pressure means.

* * * * *